United States Patent [19]

Schaeff

[11] Patent Number: 5,178,238
[45] Date of Patent: Jan. 12, 1993

[54] HYDROSTATIC BRAKING POWER CONVERTER

[75] Inventor: Hans Schaeff, Langenburg, Fed. Rep. of Germany

[73] Assignee: Karl Schaeff GmbH & Co., Maschinenfabrik, Fed. Rep. of Germany

[21] Appl. No.: 608,150

[22] Filed: Nov. 2, 1990

[30] Foreign Application Priority Data

Nov. 4, 1989 [DE] Fed. Rep. of Germany ....... 3936735

[51] Int. Cl.⁵ .............................................. B60T 1/093
[52] U.S. Cl. ..................................... 188/295; 303/10
[58] Field of Search ................... 303/10, 11, 116 PC, 303/176 WP; 188/255, 302, 296

[56] References Cited

U.S. PATENT DOCUMENTS

| 1,705,565 | 3/1929 | Harris | 188/295 |
| 2,875,871 | 3/1959 | Govan | 188/295 |
| 3,290,958 | 12/1966 | Henry-Biabaud | 188/295 X |
| 4,451,094 | 5/1984 | Martin | 188/295 X |

FOREIGN PATENT DOCUMENTS

428225 4/1947 Italy .................................. 188/295

Primary Examiner—Matthew C. Graham
Attorney, Agent, or Firm—John C. Thompson

[57] ABSTRACT

A braking power converter for trucks, busses, trailers, semitrailers and cars as a long-term brake, with oil as the working fluid and an oil cooler, wherein one or more high-pressure reciprocating pumps, which can control the transporting capacity up to zero transport, are driven continuously by the vehicle proportionately to the travelling speed, and an oil flow is compressed to a high pressure of roughly 300 to 900 bar during the braking operation, subsequently relieved of pressure and thereby heated up, after which the heated oil flow is recooled in the oil cooler.

10 Claims, 6 Drawing Sheets

RELATIVE WIND

DRIVING DIRECTION

HYDROSTATIC BRAKING POWER CONVERTER

FIELD OF THE INVENTION

The present invention relates to a hydrostatic braking energy converter for installation in self-propelled or drawn road vehicles, such as motor cars, trailers, semi-trailers, etc., as a long-term brake which does not depend on mechanical friction, which converter is actuated by the thrust of the vehicle, has oil as the working fluid and is equipped with an oil cooler.

BACKGROUND OF THE INVENTION

Braking energy converters are known by the general term "retarder". Some retarders operate according to the hydrodynamic turbine-pump principle with a built-in cooling water oil cooler. Their design resembles that of a hydrodynamic coupling, in which a stationary impeller stands opposite a rotating impeller connected with the propeller shaft of the vehicle. In this stator, the kinetic energy imparted to the hydraulic oil by the centrifugal force from the rotation of the rotor is reduced and eliminated or converted into heat. Also known in the art are electromagnetic eddy current brakes, which necessarily have a very heavy design, and whose required fan disks constantly consume power. Finally, there are hydrodynamic torque converters, which are arranged in front of the power shift gear in vehicles, and were modified to function as retarders of the kind described above using complex technology.

The known retarders have relatively large dimensions, not least because the braking capacity may only be raised by increasing the speed, oil volume and diameter of the two impellers, since the centrifugal force can only go up at a higher radius.

OBJECTS AND SUMMARY OF THE INVENTION

An object of the invention is to provide an improved design of a braking energy converter of the kind described at the outset in such a way as to make the auxiliary components embodying such converters to be built into a vehicle smaller and lighter than before, i.e. to provide them with a higher power density than known hydrodynamic units.

A further object is to make such converter autonomous and to simplify its installation in vehicles, in particular in motor cars, without having to intervene into the cooling water circulation system of a combustion engine.

In like manner, the object is to simplify installation during use in vehicles without drives, such as trailers or semitrailers, in particular by means of autonomous coolers.

The object is achieved according to the invention by one or more hydrostatic, axial piston pumps, as a result of which the braking process takes place with the generation of a controllable high-pressure oil flow, which may be brought to pressure values of roughly 300 to 900 bar (approximately 4350 to 13,000 p.s.i.). This oil pressure is released by a pilot controlled pressure relief valve arranged in the oil circulation system, during which the braking energy is converted into heat.

The hydraulic fluid serves as a heat transfer medium, which is cooled through an oil cooler, preferably with the help of ambient air. The advantage to this suggestion is that no oil flows during normal, brakeless driving and no piston pressure comes about, so that there is virtually no power loss.

In general, the pressure control valve is left at a fixed value during normal braking operation, even though either the transporting capacity or pressure may be set for adjusting the braking power. In the illustrated variable displacement inline axial piston pump, the braking power is preferably controlled with the help of the oil transporting capacity, namely by changing the inclination of the swash plate. However, control can basically also be effected with the pressure control valve using a regulating cylinder, which acts on the pilot valve allocated to the pressure relief valve.

One special feature with respect to the application of hydrostatic axial piston pumps as braking power converters according to the invention has to do with the fact that such pumps, which are able to generate a hydraulic pressure several times that of hydrodynamic units, may be kept small and, if necessary, attached directly to the wheels. In this way, the driving gears are not stressed by the braking power.

In a preferred embodiment, the pump casing or casing cover can have a built-in thermostatic control valve, which influences the closed oil circulation system in such a way that the oil is returned through a short circuit channel, bypassing the cooler, and again taken in until reaching its operating temperature.

In addition, a preferred embodiment can provide for an oil equalizing reservoir with a built-in set of small electrical pumps, which generates the control pressure necessary for pump adjustment at the beginning of the braking operation, and also keeps the oil circulation system at an operating pressure and feeds in the overflow oil that forms in the pump. The set of small electrical pumps not only refills the amount of overflow oil in the entire oil circulation system, but also applies the hydraulic control pressure for adjusting the swash plate.

The axial piston pumps used in the braking power converter according to the invention may be incorporated in various areas of the vehicle. For example, the gearbox of the vehicle can have a so-called drive-through from the propeller shaft on, which drives the pump at the propeller shaft speed or a suitably geared higher speed.

The axial piston pump can also be designed as an adapter flange pump, and be installed between the gearbox and propeller shaft by means of flanges. This adapter flange pump can also be attached directly to the pinion of the differential axle between the pinion flange and propeller shaft.

In another form of application, each pump can be driven by a carrying axle, which is in turn not motor-driven, but driven by the suitable gears, e.g. by means of conical gear wheels. Since the amount of oil flow conveyed by each pump is proportional to the wheel rotation, not additional sensors are necessary for detecting a partial block or complete stoppage of a wheel It is also possible to install each pump directly in the wheel head, in particular in the planet wheel head of the driving axle or a carrying axle, to avoid exerting stress on the bevel wheel gear, differential and propeller shaft.

Since the oil cooler need not be structurally connected with the axial piston pump, the hydraulic oil flow generated with the pump may be conveyed to any suitable area inside the vehicle (trailer) through relatively small tubes. Based on this requirement, the best cooler is an oil-to-air cooler, which is arranged in front of the water-to-air cooler of the combustion engine. The engine fan can take in the cooling air through the oil cooler, which does not emit any heat while driving.

While braking, the oil cooler heats up the air, thereby indirectly keeping the engine cooling water circuit warm during long downhill runs, or prevents the combustion engine from cooling, thereby ensuring that the cab heater supplied with the cooling water remains in a functional state. Since the ambient air is at least three times colder than the engine cooling water, even at high outside temperatures, an air-to-oil cooler is three times lighter than an engine cooling water-to-oil cooler at the same capacity, and hence to be preferred.

According to another suggestion, the oil-to-air cooler can be mounted on a structurally convenient spot along with its autonomously supplied or hydraulically driven fan. In this case, additional ram pressure makes it possible to use the relative wind.

In another feature of the present invention, the braking power converter may be furnished as a complete, ready-to-install unit, so that the oil cooler is also integrated or blocked into the unit as a whole. In this embodiment, only the electrical line for turning on the engine for the set of small electrical pumps and an actuator for controlling the adjustment of the swash plate need be provided from the outside.

Additional features and advantages of the invention arise from the following description of embodiments based on the drawings, which show details of importance for the invention. The features of the claims are not limited to application in road vehicles, and may embody additional forms of execution, whether individually or in any other combination.

DETAILED DESCRIPTION

Figures 1A, 1B, 1C:
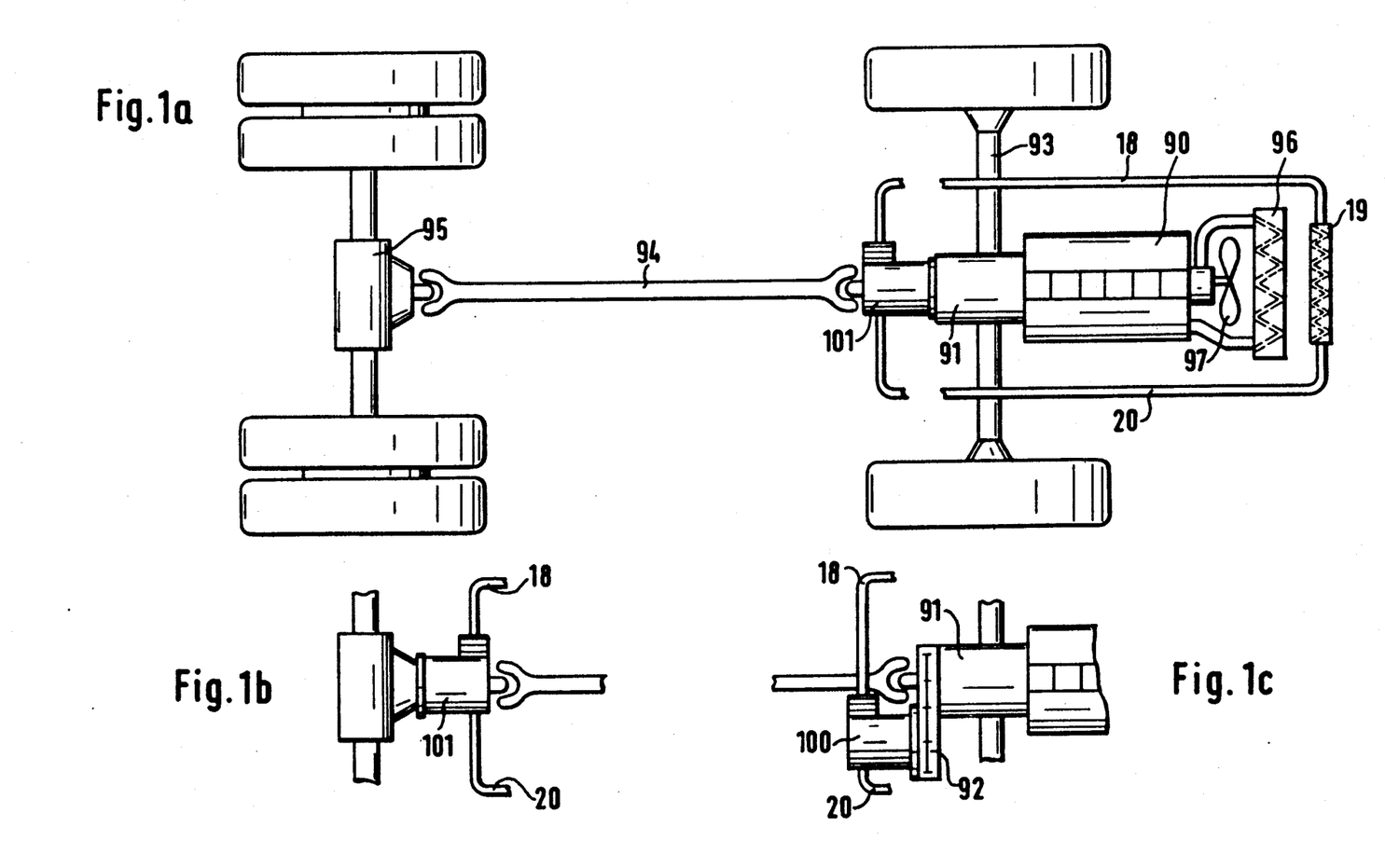
FIGS. 1a-1b, and 1c are three different ways of installing a axial piston pump as a braking power converter in a motor car with an air-to-oil cooler in front of the engine water cooler.

A road vehicle shown diagrammatically in FIG. 1a is provided with a watercooled combustion engine 90, a gearbox 91 (which may have an auxiliary drive 92 as shown in FIG. 1c) a front axle 93 and a rear axle 95 driven by means of propeller shaft 94. Engine water cooler 96 is cooled by extractor fan 97, and arranged downstream from an air-to-oil cooler 19 of the brake unit. Examples for mounting a brake pump are given in FIG. 1a-c. Shown in FIG. 1a is the installation of a flange pump 101 between the gear box 91 and propeller shaft 94, shown in FIG. 1b is the installation of flange pump 101 between the rear axle 95 and propeller shaft 94, and shown in FIG. 1c is the attachment of pump 100 with one shaft end on auxiliary drive 92 of gearbox 91.

Figure 2:
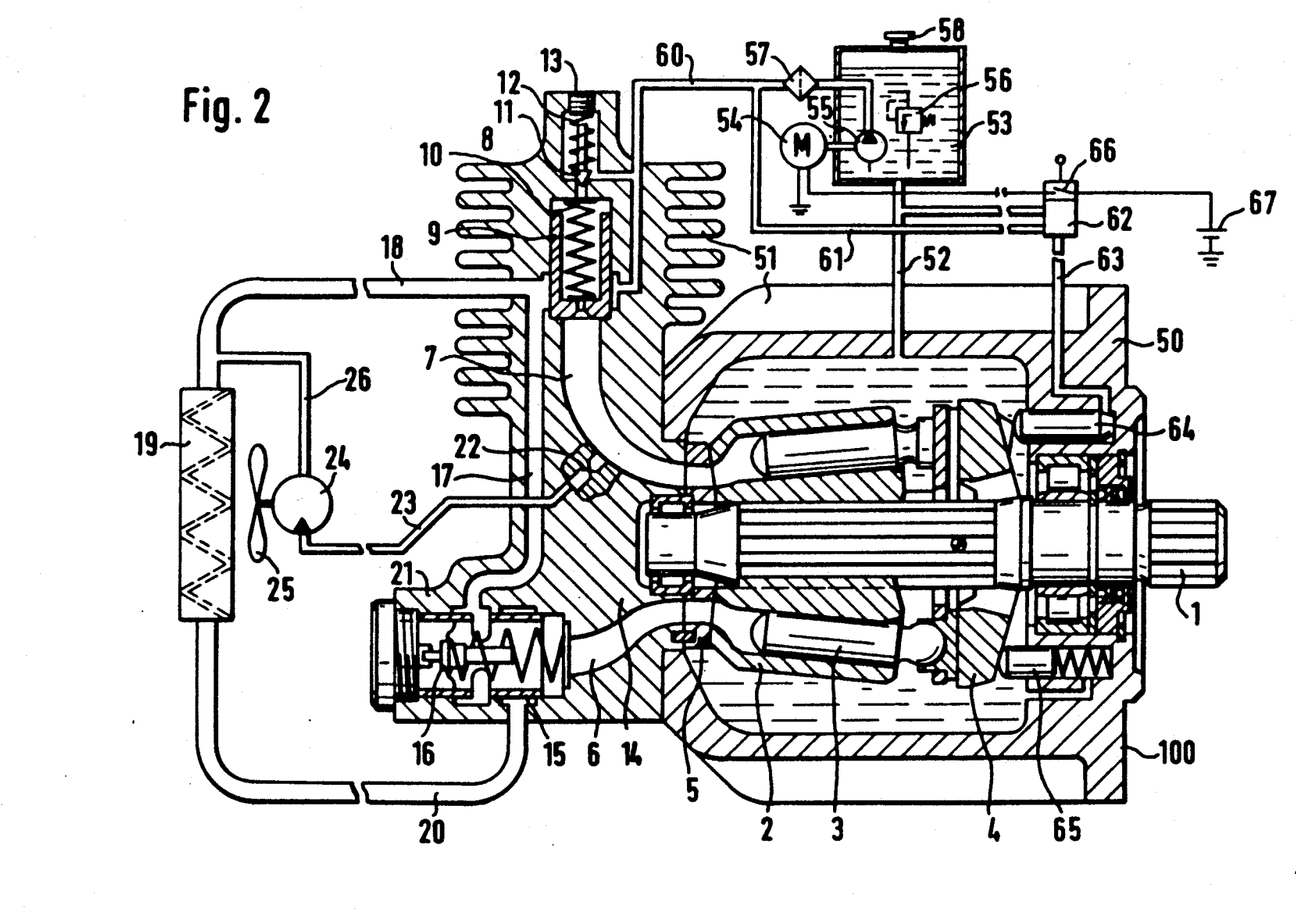
FIG. 2 is a section through the pump shown in FIG. 1c with the axial piston axial reciprocating pump in the neutral position, with a relief valve, thermostat controller, diagrammatically indicated equalizing reservoir, set of small electrical pumps and air-to-oil cooler with autonomous hydraulic fan drive.

On FIG. 2, pump shaft 1 and rotating cylinder block 2 are driven by the vehicle via gear box 91, auxiliary drive 92 and spline shaft 1. Pistons 3 in the cylinder block 2 rotate with the block about the axis of the shaft 1 when the shaft is rotated, but do not execute any lifting motion, since swash plate 4 is perpendicular to the to the pump shaft. As a result, the oil also does not flow through control disk 5, and the following suction port 6, or through pressure duct 7.

Main piston 9 of a pilot controlled pressure relief valve 8 keeps pressure channel 7 closed by bending main spring 10. The operation of pilot controlled relief valves, in which the main spring must only exert a small share of the closing pressure, while the hydraulic pressure itself exerts the larger share, is generally known. The initial tension of pilot springs 12 on pilot piston 11 is altered to adjust the pressure of the relief valve. In the example shown, the initial tension is fixed by an adjusting screw 13 on the upper side of the portion of pump lid or cover 14, which is provided with cooling ribs 51. The depicted adjusting screw 13 can be replaced by a servo-piston, which changes the initial tension of pilot spring 12, and hence the brake pressure in various suitable dependencies.

At the valve casing or pump casing and casing lid, cooling ribs 51 dissipate some of the heat which forms at the pressure relief valve directly into the air. The suction side of the pump has a thermostatically actuated valve including a slide or sleeve 15 with a thermal piston 16. In a cold state, it is operated in such a way that the bypass or short circuit channel 17 is connected with pump induction port 6. The output line 18 following pressure relief valve 8 and pressure duct 7 is connected with the input of an air-to-oil cooler 19, and return line 20 unites the cooler output with thermostat casing 21. When thermal piston 16 is cold, i.e. in a contracted state, the return line 20 running through cooler 19 is blocked. An orifice or restrictor aperture 22 routes pressure line 23 from pressure channel 7 to a hydraulic fan motor 24, whose fan wheel 25 pulls air through cooler 19. Output line 26 of the fan engine is connected with the cooler input. The fan engine remains motionless if no oil flows from the pump.

Pump casing 50 is designed and dimensioned in such a way that no friction to speak of can take place between rotating cylinder block 2 and the casing wall.

Figure 2A:
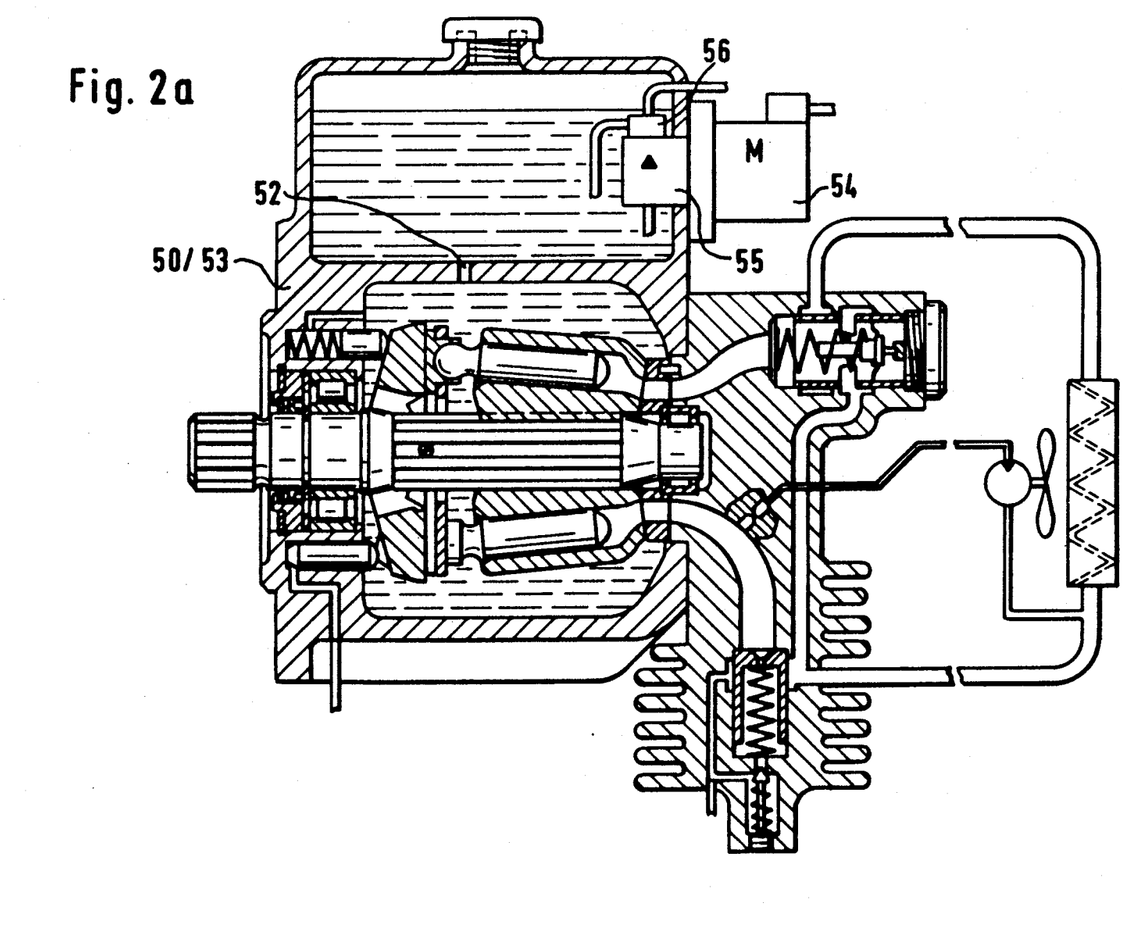
FIG. 2a is the brake set according to FIG. 2 with equalizing reservoir integrated into the pump casing.

Line 52 leads from casing 50 to an equalizing reservoir 53, for example with a built-in set of small electrical pumps, consisting of electric motor 54, low-pressure pump 55, safety valve 56 and filter 57. The equalizing reservoir is connected with the outside air by means of sealing cover 58 with a built-in ventilation system. According to the embodiment on FIG. 2a, the equalizing reservoir and the pump set described above are integrated into a single unit with pump casing 50, so that line 52 is reduced to a bore hole.

One tube each 60 and 61 lead from the pump output behind filter 57 to output line 18 of the oil circulation system and to a controller 62, which is connected with a servo-adjuster of swash plate 4 by means of line 63. The servo-adjuster is generally known, and therefore only indicated here by a control piston 64 and reset system 65.

Controller 62 is connected with a switch 66 which interrupts the supply of power from vehicle electrical system 67 when the brake pump is at rest.

Figure 3:
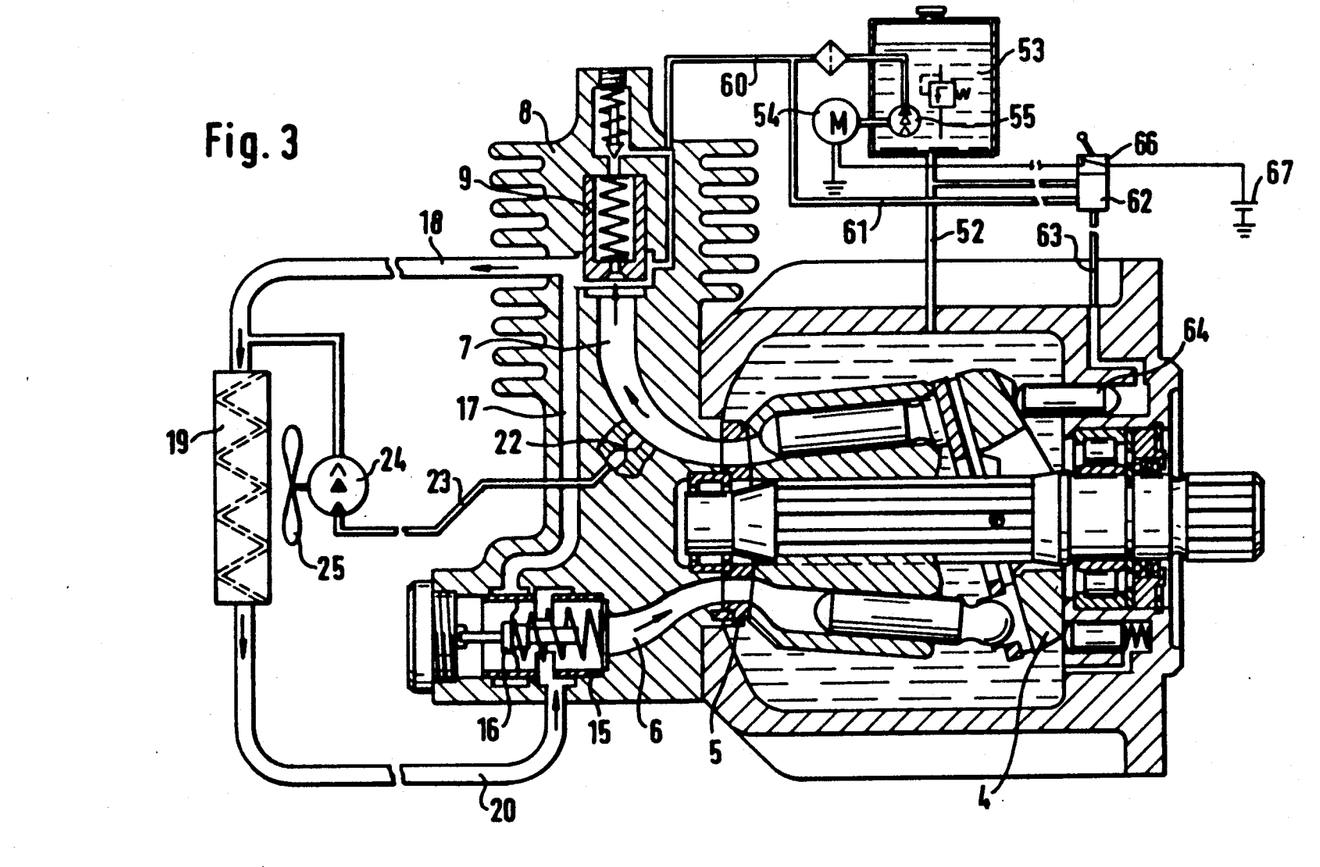
FIG. 3 is the braking power converter from FIG. 2 while braking, with the set of small electrical pumps turned on and the swash plate swivelled.

FIG. 3 shows the brake unit in operation, with the braking function being initiated as follows:

The driver or a built-in brake controller closes the circuit between vehicle electrical system 67 and electric motor 54 with the help of switch 66. At the same time, controller 62 is actuated by hand or with an electromagnet in such a way that the pressure generated by the low-pressure pump 55 (approx. 10-20 bar; transporting capacity: approx. 10-20 l/min) acts on control piston 64, which partially or completely swivels captive C washer 4.

At the same time, the entire oil circulation system is pressurized via tube or line 60, so that the same low-pressure conditions prevail in output line 18, cooler 19, return line 20, internal return line 17 and suction port 6. This measure is advisable for creating good suction conditions for high pump speeds, avoiding cavitation, and balancing out the losses of oil in the pump due to overflow.

Since swash plate 4 is swivelled out of its neutral position, pressure duct 7 has an oil flow which lifts main piston 9 of pressure relief valve 8 from its seat. Subjecting the valve to initial tension generates a high pressure in the pressure channel (e.g. 500 bar). This pressure is relieved by opening pressure relief valve 8, during which the oil flow gets heated up.

At first, the thermostat slide 15 assumes the position shown on FIG. 2. As a result, the oil cannot flow through cooler 19, but instead passes directly into induction port 6 via short circuit channel 17, thereby heating up thermal piston 16 until the operating temperature (approx. 40° C.) of the oil has been reached. If the oil gets hotter, the thermostat slide 15 gradually moves into the position shown on FIG. 3, in which the bypass is closed and the oil flows through oil cooler 19. As soon as the high pressure has built up in pressure channel 6, a small amount of oil flows through orifice 22 to the fan motor, which now drives the fan regardless of whether oil is flowing through the cooler already or not.

The highest braking power is reached at a full throughput (max. pump speed) and maximum pressure setting on the valve.

The following will be assumed for a theoretical calculation of power without taking into account losses owing to friction, etc.:

Speed of pump = 3000 RPM

Specific trasporting capacity $Q_S$ = 90 cm³/rev

Transporting capacity $Q = \frac{3000 \times 90}{1000} = 270$ l/min

Brake pressure $P$ = 500 bar

Then, the power measures:

$N = \frac{P \times Q}{612}$ (KW)

$N = 500 \times 270 = 220$ (KW)

The oil removed by screen 22 does not have to be subtracted, since it is also relieved by 500 bar.

The power of the electric motor calculated from 10 bar at 2 l/min measures $$N_E = \frac{10 \times 2}{612} = 0.0326 \text{ KW (theoretical)}$$

When the circuit is interrupted at switch 66, controller 62 operates the servo-control of the pump in such a way that control piston 64 is depressurized and captive C washer 4 returns to a neutral position according to FIG. 2. The high pressure pump transports no more oil, and the pressure in pressure channel 7 is relieved. The fan stops. Of course, the pump may also be operated in such a way that it does not stop entirely, but still conveys a tiny amount of oil, either continuously or for a certain time, in order to lubricate plate cam 5 and compensate for the heat.

Figure 4:
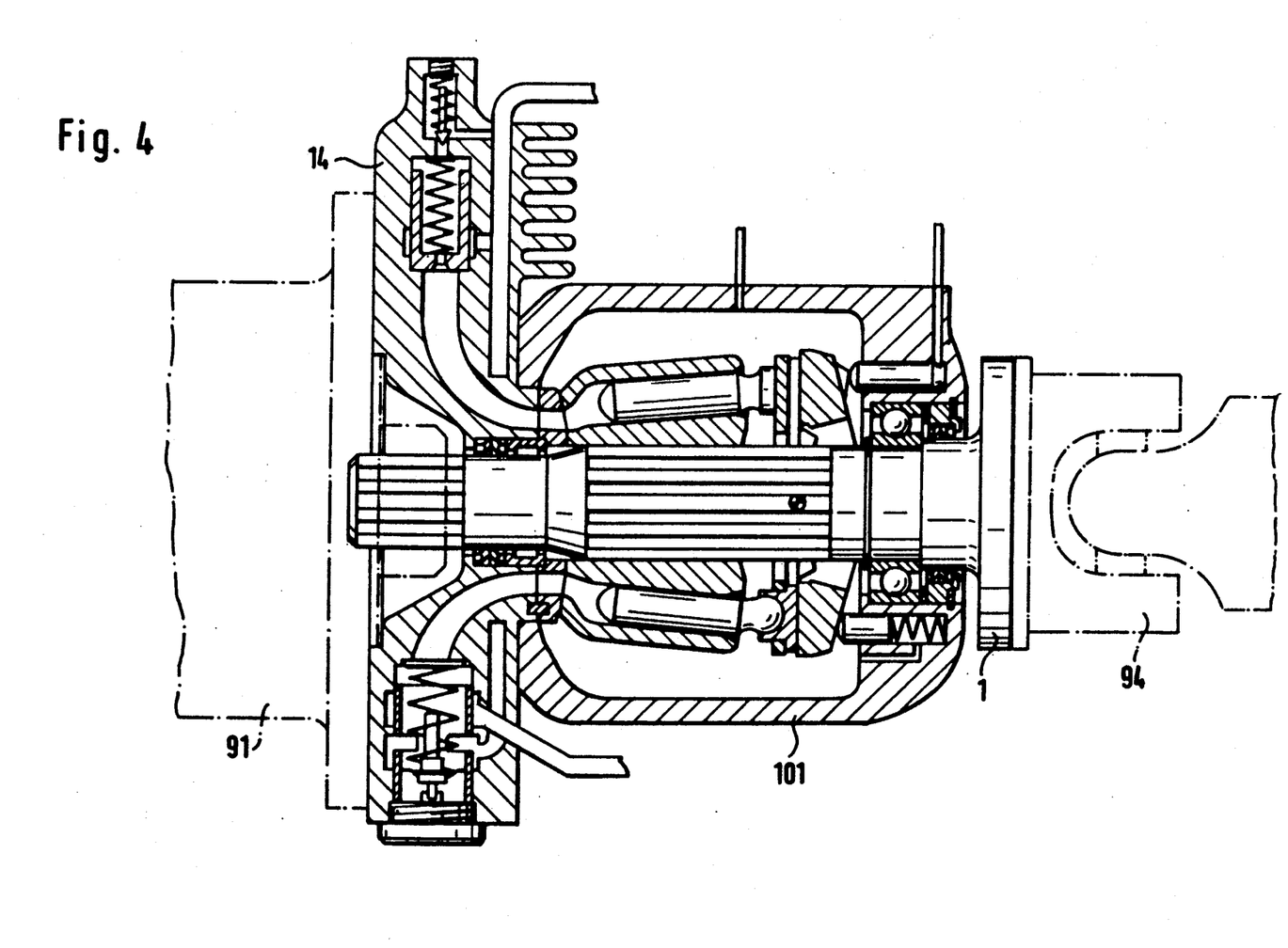
FIG. 4 is the axial reciprocating piston pump shown in FIGS. 1a and 1b, which pump is similar to the pump shown in detail in FIGS. 2 and 3, but designed as an adapter flange pump, wherein the left side of the pump casing has a connecting surface for a gear, and the right side has a propeller shaft connecting flange.

FIG. 4 shows an adapter flange design 101 of the axial axial pump 100 from FIG. 2. Pump shaft 1 is designed as a flange shaft, and pump cover 14 is altered in such a way that pump shaft 1 projects in the middle of the shaft end, and that the left side of pump cover 14 can be flanged to the gear. Propeller shaft 94 may be connected to the other side of the pump shaft.

Figures 5, 5A:
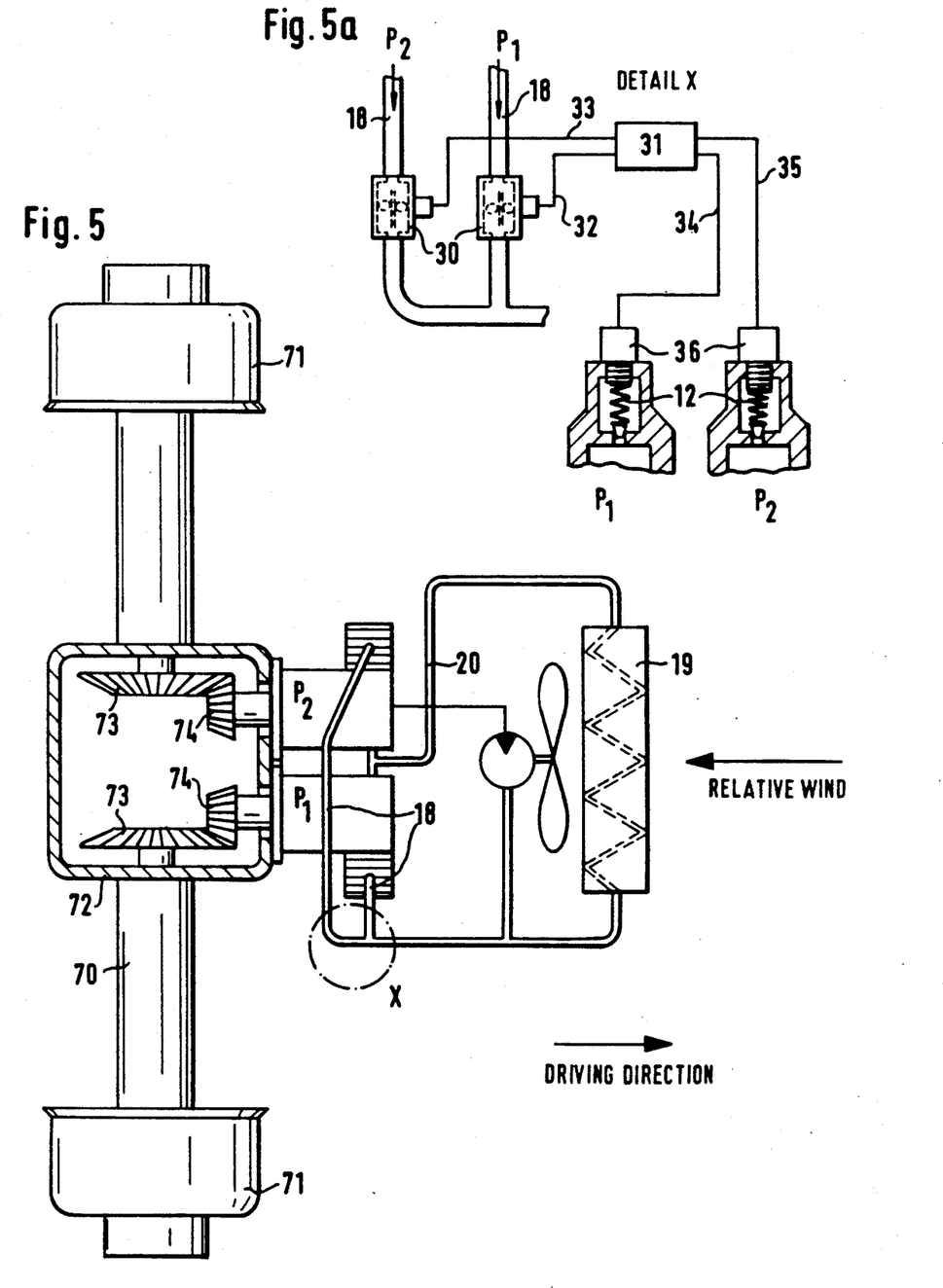
FIG. 5 is a non-driven vehicle axle with two brake pumps, which are driven by vehicle wheels or tires via conical gear wheels.
FIG. 5a is diagrammatic view of a transporting capacity-dependent pressure controller as an antiblocking system.

FIG. 5 shows a trailer axle 70 with friction brakes 71 on the vehicle wheels and a middle section 72, e.g. a double bevel gear pair, in which one large ring gear 73 is driven by each wheel side. Two pumps P1 and P2 of the kind shown on FIG. 4 are driven by smaller conical pinions 74 in order to ensure curve compensation. The pumps are connected in parallel, and otherwise operate as described on FIGS. 2 and 3. The oil cooler has an autonomous fan drive which is particularly favorable for trailers, and is situated in the relative wind in such a way that the wind assists the fan. Drive casing 72 can serve as the equalizing reservoir for both pumps P1 and P2, just as the equalizing reservoir 53 on FIG. 2 or FIG. 2a.

According to FIG. 5a, an antiblocking effect may be achieved for a drawn axle (for an axle of a drawn vehicle) by installing flowmeters 30 in each of the two output lines 18 of pumps P1 and P2, which relay their measuring pulses to a controller 31 via measuring lines 32 and 33. The amount of oil conveyed is proportional to the revolutions of the respectively driven (decelerated) wheel. Therefore, while blocking or already during a relative drop in speed from one wheel to the next, the pressure of the respective pump can be relieved from the controller over control lines 34 and 35 until the wheels again run in approximately a synchronous manner. The pressure at pressure relief valve 8 of the pumps is changed by means of adjusting devices 36, which load or relieve pilot springs 12, and thereby change the operating pressure of the entire pilot controlled pressure relief valve 8.

What is claimed is:

1. A hydrostatic braking energy converter of the retarder type for installation in self-propelled or pulled vehicles, comprising:
a compact converter housing unit integrating at least a hydraulic displacement pump (1-5, 50) having an inlet suction duct (6) and an outlet delivery pressure duct (7), a pressure relief valve (8) normally seated to close said pressure duct, and a return line (17) leading from the pressure relief valve to the suction duct (6) of the pump, the components being connected in series and forming a closed hydraulic circuit, the displacement pump having reciprocating pistons (3), and control means (64, 65) for varying down to zero delivery and for high pressure delivery in the range of about 300 to 900 bar, the displacement pump having a drive shaft adapted to be coupled to a drive of the vehicle by means of a step-up gearing, and for being driven by the vehicle's thrust energy during braking to convert the thrust energy into heat;

an oil cooler (19) connected via loop lines (18, 20) extending externally from the converter housing unit, and wherein a thermostat-controlled by-pass valve (15, 16) is connected to the loop lines to prevent fluid flow to the oil cooler until the oil within the converter housing is heated; and a blower means (25) which may cause air to flow through the oil cooler when the displacement pump is being driven during braking.

2. The converter as set forth in claim 1, wherein an equalizing oil reservoir is operatively associated with the compact converter housing unit, and wherein an independent electro-pump (55) is provided acting between the equalizing oil reservoir (53) and the closed circuit for constantly preloading the closed circuit by a pressure of about 10 bar.

3. The converter as set forth in claim 1, wherein a casing is provided for the pressure relief valve, the casing being provided with cooling ribs.

4. The converter as set forth in claim 1, wherein the thermostat-controlled valve is integrated into the converter housing unit to control the closure of the return line (17) and the opening of the loop lines (18, 20).

5. The converter as set forth in claim 1, wherein the blower means includes a hydraulic motor (24), which is driven by pressurized oil from a branch line (23) connected to the pressure duct (7) by means of a restrictor aperture (22).

6. The converter as set forth in claim 1, wherein the pump high pressure delivery is adjustable by control means (12, 13) acting to vary the pre-stressing of the pressure relief valve.

7. The converter as set forth in claim 11, wherein the displacement pump includes one of radially and axially reciprocating pistons and is of double-action type, with two shaft ends and connecting flanges at its casing for attachment and installation between one of two axle and shaft sections, especially in a symmetrical manner.

8. The converter as set forth in claim 1, wherein the oil cooler (19) is disposed in front of a water cooler (96) of a combustion engine relative to the cooling air flow.

9. The converter as set forth in claim 1, wherein two converter units are provided symmetrically to a differential axle (70) and disposed in hydraulic parallel connection to replace a differential gear and ensure a uniform braking torque distributor.

10. The converter as set forth in claim 1, comprising two converter units each being driven by one of the wheels of a non-driven axle of a vehicle, measuring means (30) to measure the delivery of the displacement pump of each converter unit, and control means (31) to compare the measured delivery values and to control adjusting means (36) of each of the pressure relief valves (8) of the converter units, so as to relieve from pressure one of completely and partially for a short time that the converter unit, the driving wheel and hence the pump delivery of which has come to one of a stop or has come to differ too far from the delivery of the other pump driven by the other wheel.

* * * * *